(12) United States Patent
Iyer et al.

(10) Patent No.: US 11,440,193 B2
(45) Date of Patent: Sep. 13, 2022

(54) METHOD, DEVICE, AND SYSTEM FOR MANAGING COLLABORATION AMONGST ROBOTS

(71) Applicant: Wipro Limited, Bangalore (IN)

(72) Inventors: Manjunath Ramachandra Iyer, Bangalore (IN); Chandrashekar Bangalore Nagaraj, Bangalore (IN); Shashidhar Soppin, Bangalore (IN)

(73) Assignee: Wipro Limited, Bangalore (IN)

( * ) Notice: Subject to any disclaimer, the term of this patent is extended or adjusted under 35 U.S.C. 154(b) by 268 days.

(21) Appl. No.: 16/914,553

(22) Filed: Jun. 29, 2020

(65) Prior Publication Data

US 2021/0299875 A1 Sep. 30, 2021

(30) Foreign Application Priority Data

Mar. 30, 2020 (IN) .............................. 202041013793

(51) Int. Cl.
| | |
|---|---|
| *B25J 9/16* | (2006.01) |
| *B25J 9/00* | (2006.01) |
| *G06Q 10/00* | (2012.01) |
| *H04L 9/40* | (2022.01) |
| *G06N 3/08* | (2006.01) |

(52) U.S. Cl.
CPC ........... *B25J 9/1682* (2013.01); *B25J 9/0084* (2013.01); *B25J 9/161* (2013.01); *B25J 9/1605* (2013.01); *B25J 9/1661* (2013.01); *G06N 3/08* (2013.01); *G06Q 10/20* (2013.01); *H04L 63/0428* (2013.01)

(58) Field of Classification Search
CPC ...... B25J 9/1682; B25J 9/0084; B25J 9/1661; B25J 9/1605; B25J 9/161; G06Q 10/20; H04L 63/0428; G06N 3/08
USPC ................ 700/245, 253, 248; 901/1, 30, 41; 318/568.12, 568.24, 568.16
See application file for complete search history.

(56) References Cited

U.S. PATENT DOCUMENTS

2017/0235316 A1* 8/2017 Shattil .................. G05D 1/0088
 701/3
2018/0075402 A1* 3/2018 Stadie .................. B65G 1/1378
(Continued)

FOREIGN PATENT DOCUMENTS

| CN | 106875090 A | 6/2017 |
|---|---|---|
| EP | 1563348 A2 | 8/2005 |
| WO | 2017152067 A1 | 9/2017 |

*Primary Examiner* — Dalena Tran
(74) *Attorney, Agent, or Firm* — Finnegan, Henderson, Farabow, Garrett & Dunner, LLP

(57) ABSTRACT

A method, device and system for managing collaboration amongst robots is disclosed. The method may include assigning a color tag from a set of predefined color tags to each of a plurality of robots, based on associated functional capabilities. The method may further include dynamically creating a plurality of groups for a plurality of tasks based on at least one attribute associated with each of the plurality of tasks and functional capabilities associated with the plurality of robots. The method may include electing a plurality of chief robots for the plurality of groups based on a first predefined logic. The method may include selecting a prime robot from the plurality of chief robots based on a second predefined logic and the selected prime robot may be configured to monitor activity of each of the plurality of groups and each robot in each of the plurality of groups.

20 Claims, 9 Drawing Sheets

(56) References Cited

U.S. PATENT DOCUMENTS

| | | | |
|---|---|---|---|
| 2018/0108102 A1* | 4/2018 | Kapuria | B65G 1/137 |
| 2018/0158016 A1* | 6/2018 | Pandya | G05B 19/41895 |
| 2018/0182054 A1* | 6/2018 | Yao | G06Q 50/28 |
| 2018/0188747 A1* | 7/2018 | Venturelli | G08G 5/0026 |
| 2019/0066013 A1 | 2/2019 | Gupta et al. | |
| 2019/0378077 A1 | 12/2019 | Look et al. | |
| 2019/0387944 A1 | 12/2019 | O'Brien et al. | |

* cited by examiner

| Task Name: T1 | | | |
|---|---|---|---|
| Sub Task Name | Drone | Robots | Combination |
| S1 | D1, D3 D8, D11 | R3, R6 R9, R10 | D1, R10 D9, R3 |
| S2 | D3, D6 | | D3, R6 D8, R3 |
| S3 | D5 D9 | | |
| S4 | | R4 R5 | |

FIG. 6

METHOD, DEVICE, AND SYSTEM FOR MANAGING COLLABORATION AMONGST ROBOTS

TECHNICAL FIELD

This disclosure relates generally to robots and more particularly to method, device, and system for managing collaboration amongst robots.

BACKGROUND

Robots are widely used for process execution in the industries. With the advancements in technologies, their number for adoption has increased substantially. In manufacturing industries, they perform a variety of functions such as lifting and movement of objects from a given location, to brushing and cleaning of machine parts. In retail and online shopping, they pick up the objects of choice and package the same in a predefined fashion for dispatch. Based on the nature of the task they perform and the capability, a robot often collaborates with one or more robots to complete the task. The task of each of them is predefined to ensure a smooth hand off and in time completion.

In present era, it calls for enormous efforts from the domain expert to define the task till last mile. Even a slight variation in the task is not tolerable, leave alone handling a set of tasks defined on the fly. Although robots can perform this, they don't know the sequence of execution. To make the system more useful, robust and reduce the resources in maintaining so many task specific systems, a method is required to generate the execution workflow adaptively from the task defined to the system.

Currently, there is a lack of mechanism to exploit the capabilities of robots and drones to make them work together for completing the tasks. Also, there is a lack of precise communication protocol to allow robots and drones to communicate and collaborate for effective task completion. In addition, there is also a lack of mechanism which generates the optimal ordered sequence of task execution including drones and robots avoiding conflicts, intruder attack and supporting seamless execution with support from other robots and drones. Therefore, there exists a need to develop a method, device and system that provides solution to the aforementioned drawbacks.

SUMMARY

In one embodiment, a method for managing collaboration amongst robots is disclosed. The method may include assigning a color tag from a set of predefined color tags to each of a plurality of robots, based on associated functional capabilities. The method may further include dynamically creating a plurality of groups for a plurality of tasks based on at least one attribute associated with each of the plurality of tasks and functional capabilities associated with the plurality of robots. The method may include electing a plurality of chief robots for the plurality of groups based on a first predefined logic. The method may include selecting a prime robot from the plurality of chief robots based on a second predefined logic.

In another embodiment, a device for managing collaboration amongst robots is disclosed. The device includes a processor and a memory communicatively coupled to the processor, wherein the memory stores processor instructions, which, on execution, cause the processor to assign a color tag from a set of predefined color tags to each of a plurality of robots, based on associated functional capabilities. The processor instructions further cause the processor to create dynamically a plurality of groups for a plurality of tasks based on at least one attribute associated with each of the plurality of tasks and functional capabilities associated with the plurality of robots. The processor instructions cause the processor to elect a plurality of chief robots for the plurality of groups based on a first predefined logic. The processor instructions further cause the processor to select a prime robot from the plurality of chief robots based on a second predefined logic.

In another embodiment, a system for managing collaboration amongst robots is disclosed. The system includes a plurality of robots and a central controller communicatively coupled to each of the plurality of robots, wherein the central controller may be configured to assign a color tag from a set of predefined color tags to each of a plurality of robots, based on associated functional capabilities. The central controller further configured to create dynamically a plurality of groups for a plurality of tasks based on at least one attribute associated with each of the plurality of tasks and functional capabilities associated with the plurality of robots. The central controller further configured to elect a plurality of chief robots for the plurality of groups based on a first predefined logic. central controller further configured to select a prime robot from the plurality of chief robots based on a second predefined logic.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 illustrates a table depicting suitable allocation of one or more of drones and robots for performance of a plurality of sub-tasks associated with a task, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
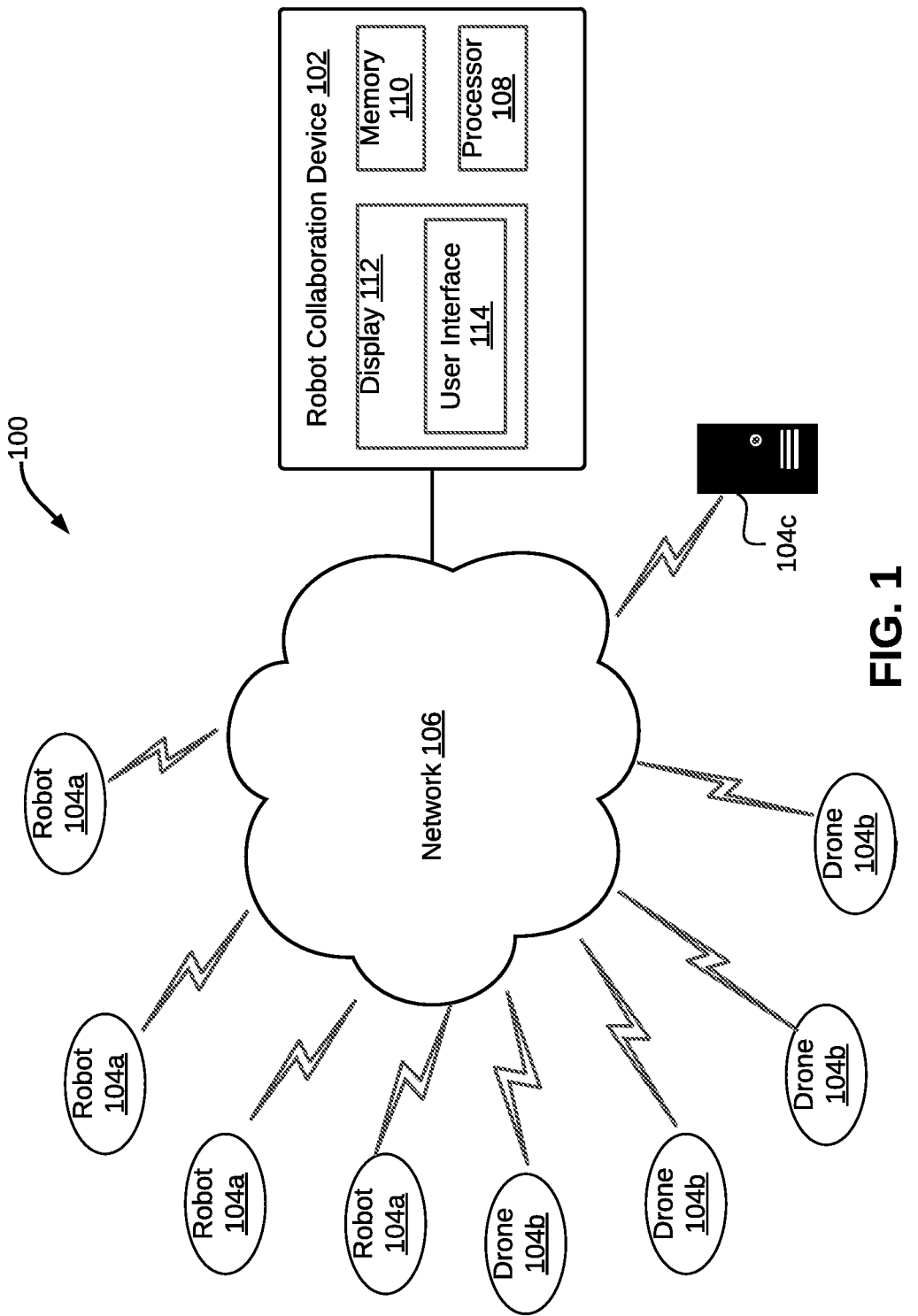
FIG. 1 is a block diagram illustrating a system for managing collaboration amongst robots, in accordance with an embodiment.

Referring now to FIG. 1, is a block diagram of a system 100 for managing collaboration amongst robots is illustrated, in accordance with an embodiment. It will be apparent to a person skilled in the art that a robot may be a drone. The system 100 may include a robot collaboration device 102 that may be configured to manage collaboration amongst a plurality of robots 104a and a plurality of drones 104b. In an embodiment, the robot collaboration device 102 may act as a central controller for managing collaboration amongst the plurality of robots 104a and the plurality of drones 104b.

Each of the plurality of robots 104a and the plurality of drones 104b may be communicatively coupled to the robot collaboration device 102 via a network 106. Additionally, the plurality of robots 104a and the plurality of drones 104b may be configured to communicate amongst each other through the network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), Bluetooth, and General Packet Radio Service (GPRS).

The system 100 may further include a server 104c (for example, an application server) that is communicatively coupled to the plurality of robots 104a and the plurality of drones 104b through the network 106 to store a plurality of data. The plurality of data may include (for example, details associated with each of the plurality of robots 104a and the plurality of drones 104b and their distinct functional capabilities). The server 104c may be further communicatively coupled to the robot collaboration device 102 through the network 106.

The robot collaboration device 102 may include a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access Memory (SRAM). The memory 110 may further include various modules that enable the robot collaboration device 102 to manage collaboration amongst robots. These modules are explained in detail in conjunction with FIG. 2. The robot collaboration device 102 may further include a display 112 having a User Interface (UI) 114 that may be used by a user to provide inputs to the robot collaboration device 102.

Figure 2:
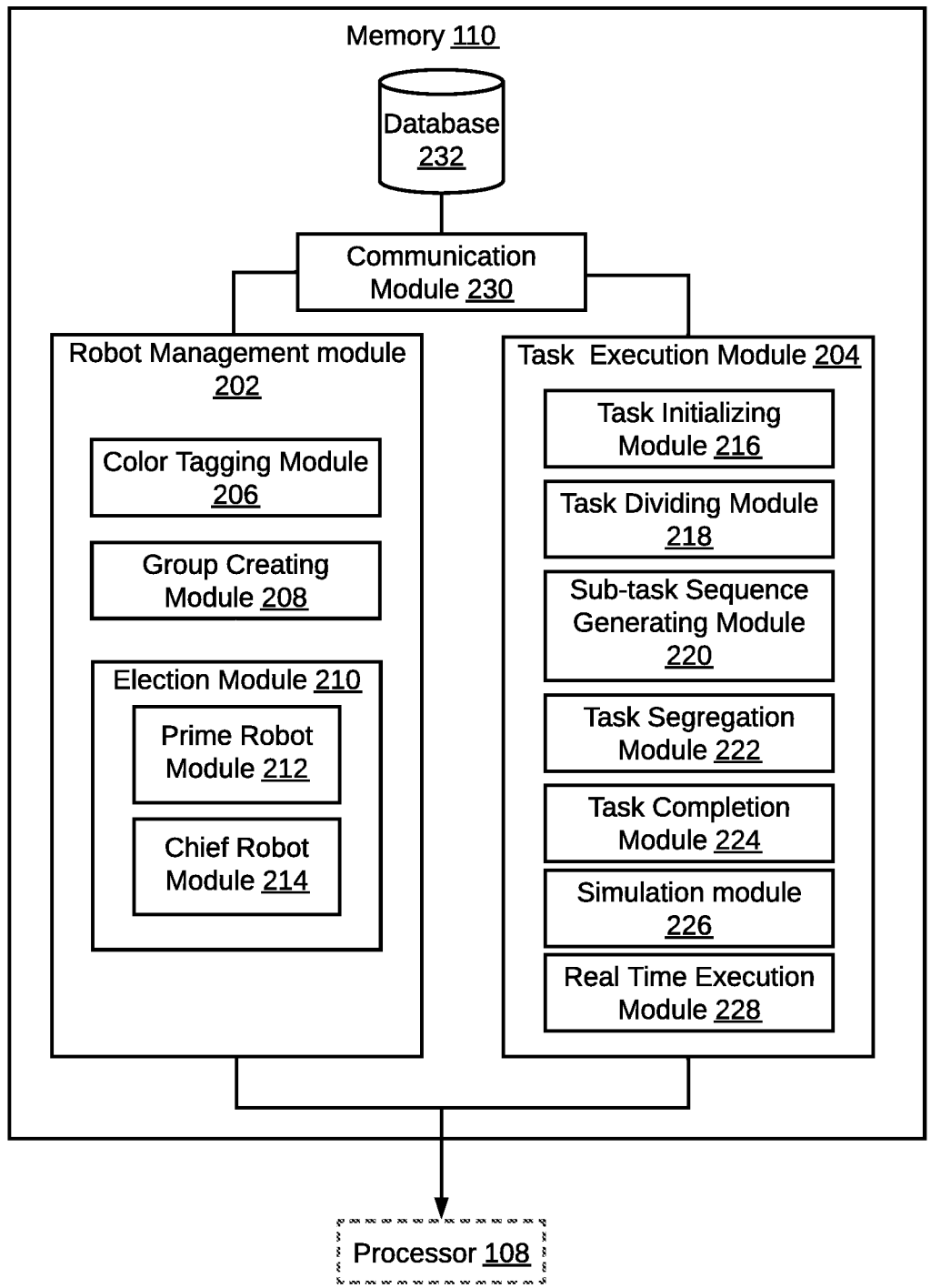
FIG. 2 is a block diagram illustrating various modules within a memory of a robot collaboration device configured to manage collaboration amongst robots, in accordance with an embodiment.

Referring now to FIG. 2, a block diagram of various modules within the memory 110 of the robot collaboration device 102 configured to manage collaboration amongst robots is illustrated, in accordance with an embodiment. The memory 110 includes a robot management module 202 and a task execution module 204. The robot management module 202 may further include a color tagging module 206, a group creating module 208, and an election module 210. The election module 210 may further include a prime robot module 212 and a chief robot module 214. The prime robot module 212 may be configured to select a prime robot and a chief robot module 214 may configured to select a plurality of chief robots. The task execution module 204 may further includes a task initializing module 216, a task dividing module 218, a sub-task sequence generating module 220, a task segregation module 222, a task completion module 224, a simulation module 226 and a real time execution module 228.

The robot management module 202 may develop a hierarchical relation amongst a plurality of robots. To this end, the color tagging module 206 may assign a color tag from a set of predefined color tags to each of the plurality of robots based on associated functional capabilities. In an embodiment, the color tagging module 206 may assign a first color tag to each of the plurality of robots that have functional capabilities less than or equal to a first threshold. The first color tag, for example, may be Cyan or Green. The color tagging module 206 may assign a second color tag to each of the plurality of robots that have functional capabilities greater than the first threshold and less than or equal to a second threshold. The second color tag, for example, may be Magenta or Blue. It may be noted that a robot assigned the first color tag is only permitted to directly communicate with a robot assigned the second color tag. Further, the color tagging module 206 may assign a third color tag to each of the plurality of robots that have functional capabilities greater than the second threshold. In an embodiment, a robot assigned the second color tag is only permitted to directly communicate with a robot assigned the third color tag. The second color tag, for example, may be Red. The color tagging module 206 may also assign a fourth color tag to a robot from the plurality of robots that is configured to provide a plurality of emergency services to at least one of the plurality of robots. Each of the remaining plurality of robots is permitted to directly communicate with the robot assigned the fourth color tag. The fourth color tag, for example, may be yellow. This is further explained in detail in conjunction with FIG. 3.

The group creating module 208 may define a group policy amongst the plurality of robots by dynamically creating a plurality of groups for a plurality of tasks. The plurality of groups may be created based on one or more attributes associated with each of the plurality of tasks and functional capabilities associated with the plurality of robots. Each of the plurality of groups may include one or more of the plurality of robots. In an embodiment, each of the plurality of groups include a first set of robots assigned the first color tag, a second set of robots assigned the second color tag, and a third set of robots assigned the third color tag. This is further explained in detail in conjunction with FIG. 3.

The election module 210 may be configured to select a plurality of chief robots and a prime robot from the plurality of chief robots. To this end, the chief robot module 214 may elect a plurality of chief robots for each of the plurality of groups. For a given group, a chief robot may be elected from the third set of robots associated with that group. Additionally, a chief robot may be elected by the first set of robots and the second set of robots in the group based on a first predefined logic. The first predefined logic may be based on a random selection. Thereafter, the prime robot module 212 may select a prime robot from the plurality of chief robots based on a second predefined logic. The second predefined logic may be based on random selection. The prime robot is configured to monitor activity of each of the plurality of groups and each robot in each of the plurality of groups. This is further explained in detail in conjunction with FIG. 3.

The task execution module 204 may help in execution of tasks on the basis of group policy assigned to the plurality of robots. The task execution module 204 may be configured to receive the plurality of tasks to be performed by the plurality of robots. The task initializing module 216 may determine at least one attribute associated with each of the plurality of tasks. The at least one attribute may include, but is not limited to purpose of the task, time to execute, priority of the task and order of tasks.

Further, the task dividing module 218 may be divide each task from the plurality of task into a plurality of sub-tasks based on the associated at least one attribute. The task dividing module 218 may further determine a set of robots from the plurality of robots that are capable of performing each of the plurality of sub-tasks. The sub-task sequence generating module 220 may create a plurality of sub-task execution sequences for each of the plurality of sub-tasks. The sub-task execution sequence associated with a sub-task may include details of at least one robot capable of performing the sub-task. The task segregation module 222 may create a task completion set for the task by segregating the plurality of sub-task execution sequences created for each of the plurality of sub-tasks. The task completion set may be allocated robots that have been assigned the first color tag.

The task completion module 224 may then process the task completion set through a neural network to generate a final task completion set. The final task completion set may further include a rearranged sequence for executing the plurality of sub-tasks, and each sub-task in the final task completion set is allocated a robot from the plurality of robots that is assigned one of the first color tag, the second color tag, or the third color tag. The simulation module 226 may then simulate execution of the task based on the final task completion set and in conformance with roles and color tags assigned to each of the plurality of robots. The real time execution module 228 may further execute the simulated task in real time environment.

The memory 110 may further include a communication module 230 that may enable communication amongst each of the plurality of robots over a secure channel using key encryption. The memory 110 may also include a database 232 that may store one or more of, but not limited to the information for each of the plurality of robots having different functional capabilities, unique Identifiers (IDs) of each of plurality of robot, a count of the number of robots, details of each of the plurality of groups created, and a task details.

Figure 3:
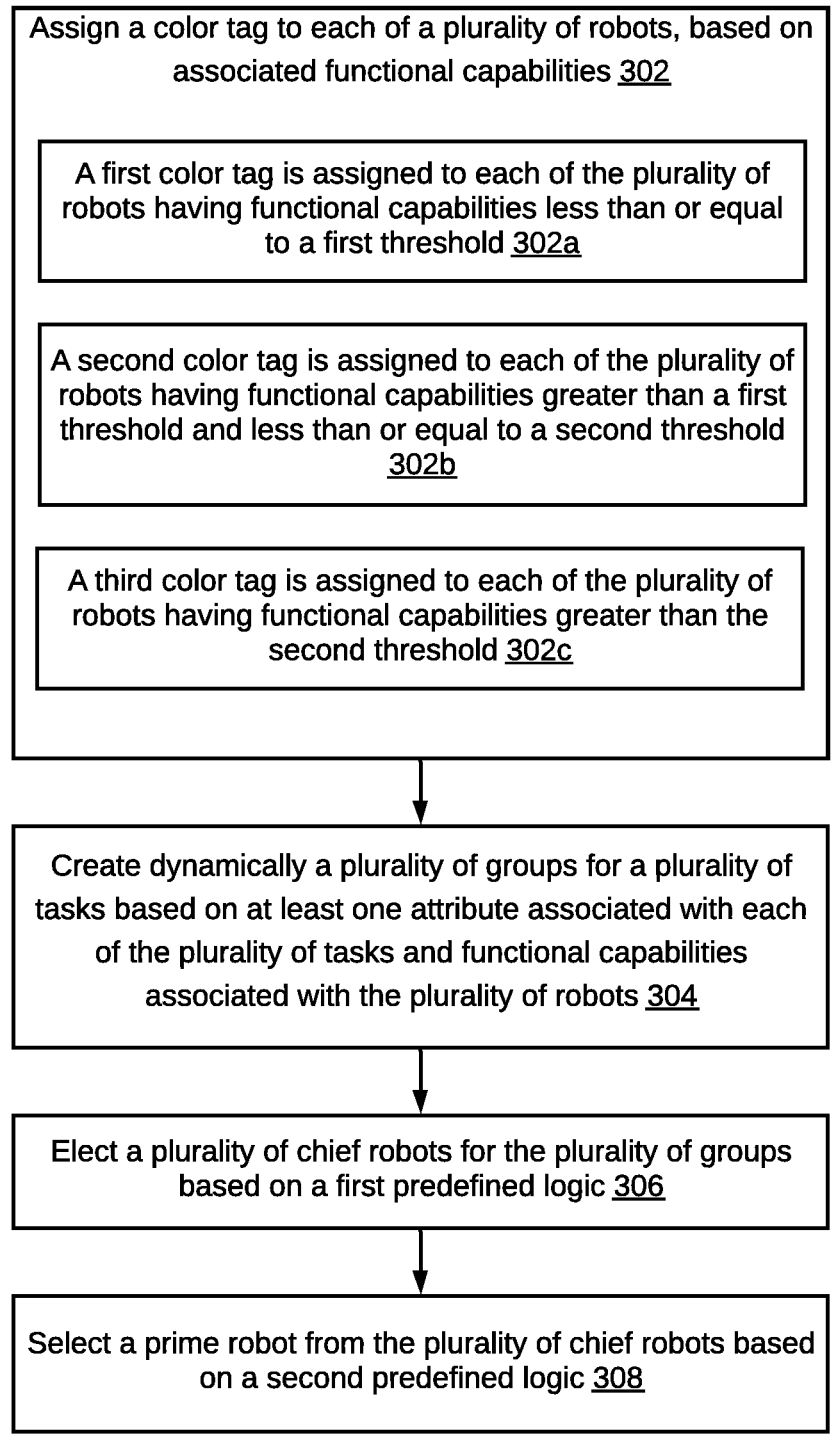
FIG. 3 illustrates a flowchart of a method for managing collaboration amongst a plurality of robots, in accordance with an embodiment.

Referring now to FIG. 3, a flowchart of a method for managing collaboration amongst a plurality of robots is illustrated, in accordance with an embodiment. The plurality of robots may include a plurality of drones. At step 302, a color tag from a set of predefined color tags may assigned to each of the plurality of robots. The assigning of the color tag to each of the plurality of robots may define a hierarchical relation amongst the plurality of robots. The predefined set of color tags, for example, may include, but are not limited to a cyan color tag, a green color tag, a magenta color tag, a blue color tag, a red color tag and a yellow color tag. In an embodiment, a separate set of color tags is assigned to the plurality of drones, in order to differentiate drones from robots. By way of an example, the cyan color tag and the magenta color tag may only be assigned to robots, while the green color tag and the blue color tag may only be assigned to drones.

The step 302 further includes a step 302a, a 302b and a 302c. At step 302a, a first color tag may assigned to each of the plurality of robots having functional capabilities less than or equal to a first threshold. By way of an example, first color tag robots, for example, may include one or more of the plurality of robots 104a and the first color tag may be the cyan color tag. The first color tag robots may also include one or more of the plurality of drones 104b and the first color tag in this case may be the green color tag. The first color tag robots may be configured to provide a service and may also be called service robots. In one embodiment, for example, robots that are tagged with the cyan color tags and drones that are tagged with the green color tag may have functional capabilities to perform only the sub tasks that are assigned to them. In other word, the drones tagged with green color tag may perform similar function as the robots tagged with the cyan color tags, but are limited to drone functions only.

At step 302b, a second color tag may be assigned to each of the plurality of robots having functional capabilities greater than the first threshold and less than or equal to a second threshold. Second color tag robots, for example, may include one or more of the plurality of robots 104a and the second color tag may be the magenta color tag. Similarly, a second color tag drones, for example, may include one or more of the plurality of drones 104b and in this case, the second color tag may be the blue color tag. A robot that is assigned the first color tag may only be permitted to directly communicate with a robot that is assigned the second color tag. This is further explained in detail in conjunction with FIG. 4A. In an embodiment, for example, robots that are tagged with the magenta color tag and drones that are tagged with the blue color tag may have functional capabilities to respectively support the cyan color tag robots and the green color tag drones by directly communicating with each other for their task completion, when requested. It may be noted that the blue color tag drones are capable of performing similar function to that of the magenta color tag robots, but are limited to drone functions.

At step 302c, a third color tag may be assigned to each of the plurality of robots that have functional capabilities greater than the second threshold. Third color tag robots, for example, may include one or more of the plurality of robots 104a and one or more of the plurality of drones 104b. In this case, the third tag may be red color tag for robots as well as drones. The third color tag robots may be configured to perform multiple functions and are skilled robots. For example, the red color tag robots and the red color tag drones may have multi-function and high capabilities to assist both the cyan and magenta robots when they are unable to handle the assigned tasks. It may further be noted that the red color tag drones are capable of performing similar function to that of the red color tag robots, but are limited to drone functions. A robot assigned the second color tag is only permitted to directly communicate with a robot assigned the third color tag. This is further explained in detail in conjunction with FIG. 4B.

In addition, a fourth color tag may be assigned to a robot from the plurality of robots 104a. This robot is configured to provide a plurality of emergency services to one or more of the plurality of robots. A fourth color tag robot may be a yellow color tag. The fourth color tag robot may be a special purpose robot which provides emergency services to the remaining plurality of robots. The emergency services, may include, but are not limited to battery recharge, extinguishing fire, handling and repairing damaged or faulty robots. Each of the remaining plurality of robots may be permitted to directly communicate with the robot assigned the fourth color tag or the fourth color tag robot. The remaining plurality of robots may include the first color tag robots, the second color tag robots, and the third color tag robots.

By way of an example, based on the functional capabilities, the assigning of the color tags to each of the plurality of robots may results in two types of a robots bands, for example the color tags assigned to the plurality of robots 104a may belongs to a CMYR band and the color tags assigned to the plurality of drones 104b may belong to an RGB band. In the CMYR band, C denotes the cyan color tag, M denotes the magenta color tag, Y denotes the yellow color tag, and R denotes the red color tag. Similarly, in the RGB band, R denotes the red color tag, G denotes the Green color tag, and B denotes the Blue color tag.

At step 304, a plurality of groups may be created dynamically for a plurality of tasks based on one or more attributes associated with each of the plurality of tasks and functional capabilities associated with the plurality of robots. The one or more attributes may include, but are not limited to the task details, such as, purpose of task, time to execute a specific task, priority of tasks, and order of tasks. All the attributes may be stored in the database 232. The purpose of task, for example, may include, but is not limited to a warehouse cleaning, arranging of products in racks, moving heavy items to storage area and shifting the entire rack to a different location within the warehouse. The time to execute, for example, may include, but is not limited to a time in which a task needs to be completed. For example in case of time critical tasks, like frozen products that need to be arranged or stored within a time limit otherwise they may become non-usable. Further, the priority of tasks may indicate tasks that need to be completed on priority. For example, tasks involving arranging products which contribute to maximum revenue need to be arranged first.

Furthermore, the order of task, for example, may be the tasks that need to be completed in specific order only. For example, cleaning or racks task may need to be completed before arranging the products on the racks. Dynamic creation of the plurality of groups based on the above mentioned attributes may define a group policy amongst the plurality of robots. The group policy may define the constraints and rules when the plurality of robots work in the groups. The group policy may further include the communication protocol restrictions and security restrictions. The communication protocol and security mechanism is further explained in detail in conjunction with FIG. 4A and FIG. 4C.

Each of the plurality of groups may include a first set of robots assigned the first color tag, a second set of robots assigned the second color tag, and a third set of robots assigned the third color tag. For example, a group may include a first set of robots having one or more cyan color tag robots and one or more green color tag drones, a second set of robots having one or more magenta color tag robots and one or more blue color tag drones, and a third set of robots having one or more red color tag robots and one or more red color tag drones. Each of the plurality of groups may include unique IDs associated with each set of robots based on the plurality of tasks and functional capabilities of the plurality of robots. All the information related to robots and tasks may be stored in the database 232. The information may include, but is not limited to the data of the robots having different functional capabilities, unique IDs of each robot, a count of the number of robots and drones, groups created, and task details.

At step 306, a plurality of chief robots may be elected for the plurality of groups. In an embodiment, the plurality of chief robots may be elected by robots in the associated first set of robots and second set of robots based on a first predefined logic. The first predefined logic may include a historic performance and capabilities of the first set of robots and the second set of robots. A chief robot of a group within the plurality of groups may be elected from a third set of robots associated with the group. This is further explained in detail in conjunction with FIG. 4B. At step 308, a prime robot may be selected from the plurality of chief robots based on a second predefined logic. The second predefined logic may include a historic performance and capabilities of the plurality of chief robots. The prime robot is configured to monitor activity of each of the plurality of groups and each robot in each of the plurality of groups which is further explained in detail in conjunction with FIG. 4B.

Figure 4A:
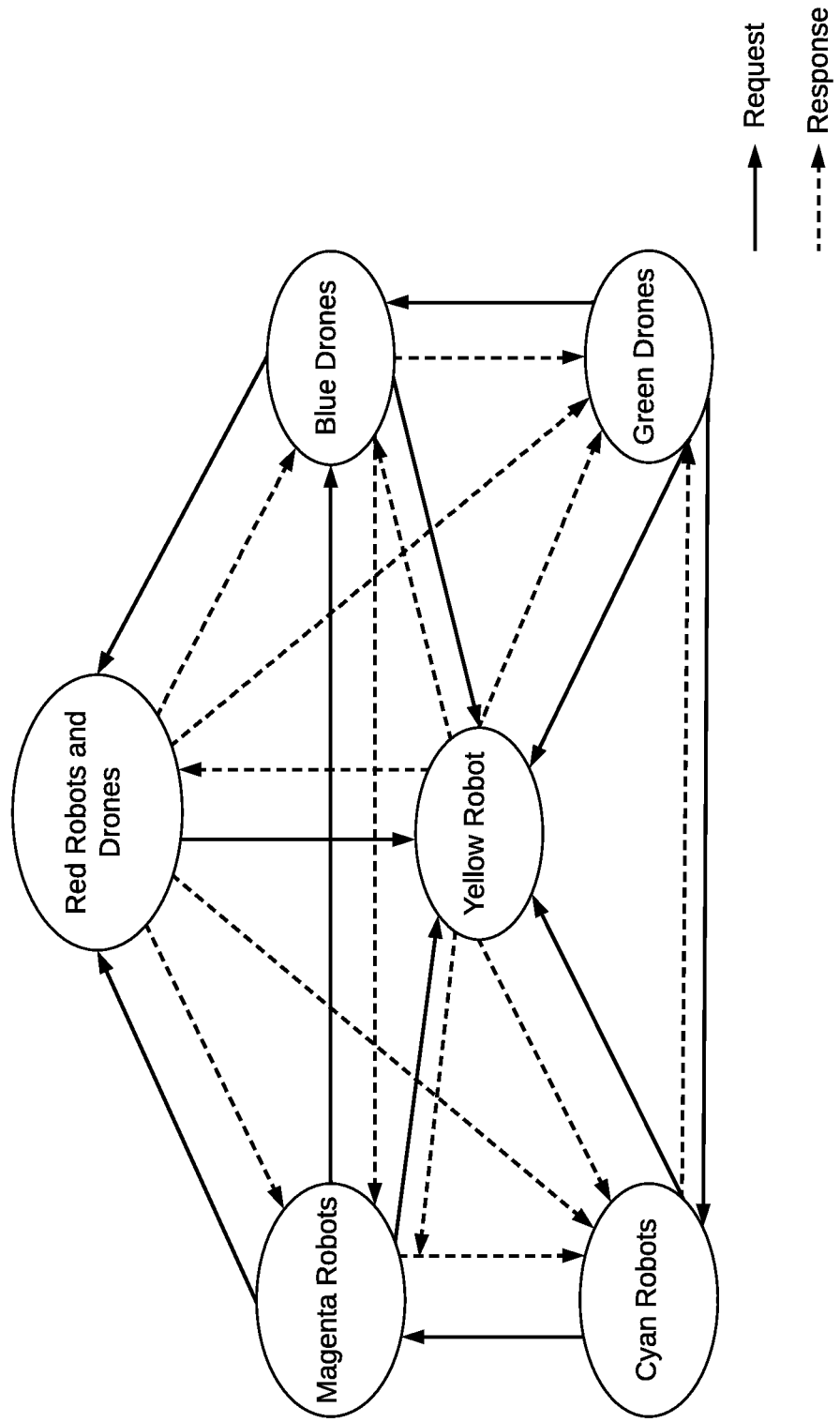
FIGS. 4A, 4B and 4C illustrate communication policy amongst a plurality of robots, election of a plurality of chief robots, and selection of a prime robot from amongst the plurality of robots, in accordance with an exemplary embodiment.
Figure 4B:
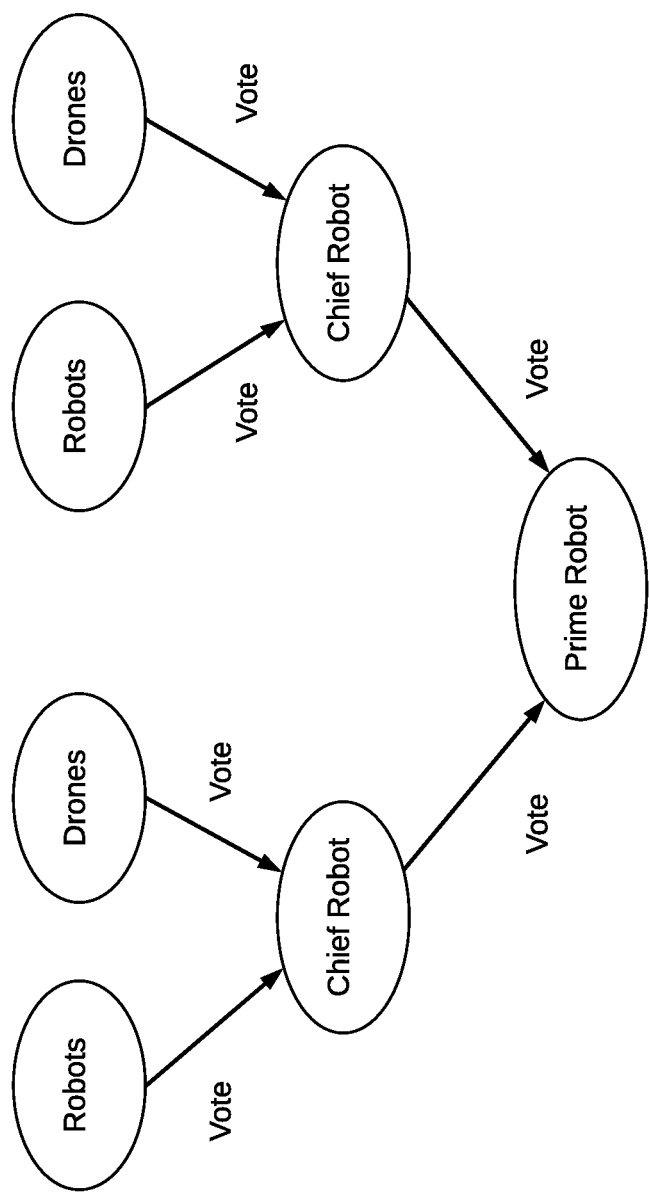
Figure 4C:
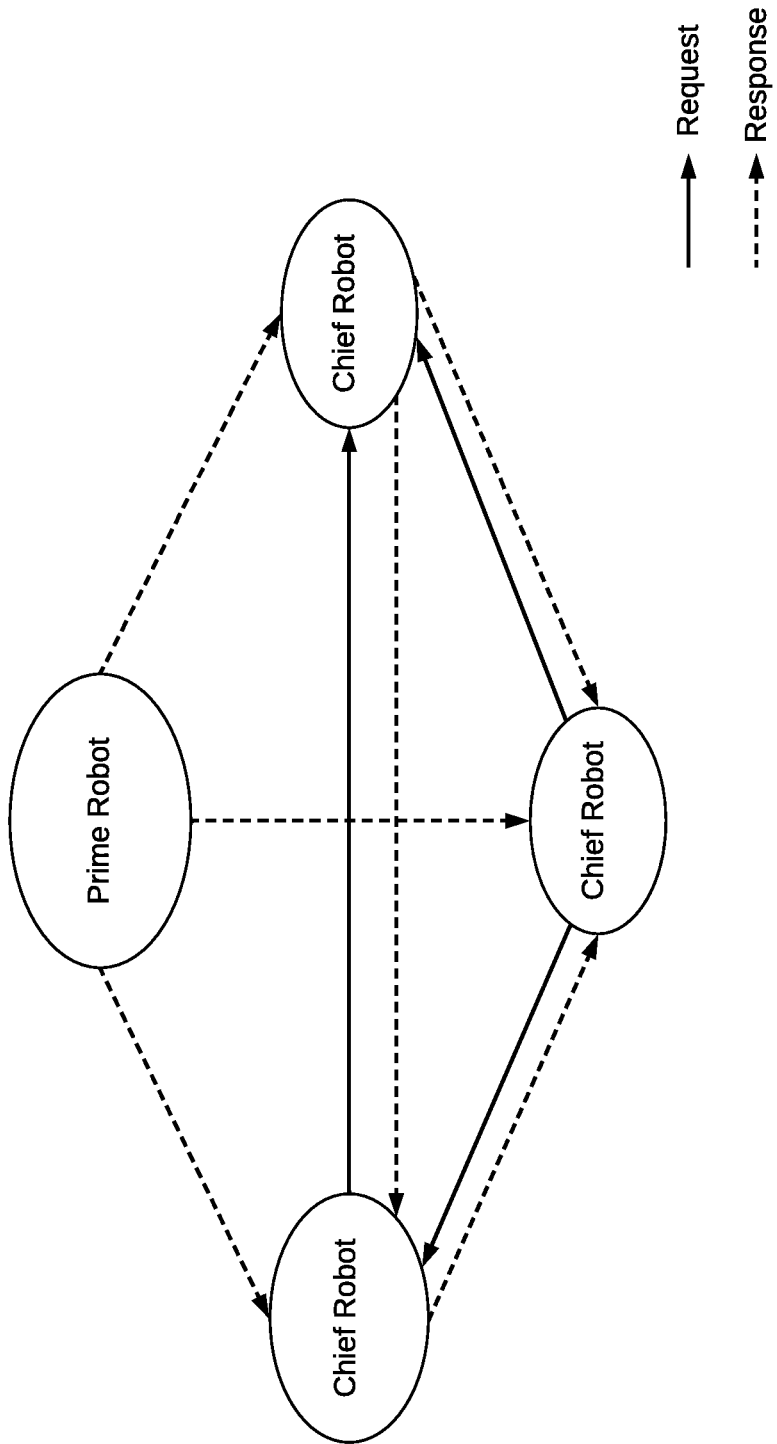

Referring now to FIGS. 4A, 4B and 4C, communication policy amongst a plurality of robots, election of a plurality of chief robots, and selection of a prime robot from amongst the plurality of robots 104a is illustrated, in accordance with an exemplary embodiment. The communication between the plurality of robots 104a and the plurality of drones 104b and between themselves may take place over a secure channel using a public/private key encryption-based security mechanism. The public key may be used to activate the overall system and the private key may be used to activate the plurality of robots 104a and the plurality of drones 104b. In a scenario where the private key for a drone or a robot does not match, then that robot or drone is detected as an intruder in the system. The protocol may protect the plurality of robots 104a and the plurality of drones 104b within an associated group from the plurality of groups by not allowing robots and drones 104b to communicate across the plurality of groups.

The protocol may be defined, so that each of the plurality of robots 104a and the plurality of drones 104b may identify which color tag robot they can communicate with. As a result of such robust policy, it may be difficult for the robots and drones to act as intruders, since each of the CMYR band robots and the RGB band drones may have different privileges. The roles and capabilities of each color tagged robot and color tagged drone are clearly defined and demarcated, which further facilitates easy assignment and subsequent execution of tasks. Therefore, creating the plurality of groups, the CMYR band for the plurality of robots 104a, the RGB band for the plurality of drones 104b, the communication protocol, and the security mechanism alone and in combination thereof may prevent conflicts, dead locks, and race condition amongst the plurality of robots 104a and plurality of drones 104b during a task execution.

As an example of the communication amongst robots and drones, exchange of request and response messages amongst the robots and the drones is depicted in FIG. 4A. The solid lines indicate transmission of the request messages from one or more of a first set of robots to one or more of a second set of robots. The request messages are used to request support for completion of tasks. In contrast, the dotted lines indicate the response messages transmitted for the corresponding request messages in order to service the one or more of the first set of robots which require support.

When one or more of the first set of robots (for example, cyan color tag robots and green color tag drones) fail to perform one or more tasks assigned to them, a request message may be sent via a communication protocol to one or more of the second set of robots (for example, magenta color tag robots and blue color tag drones) within a group in order to provide support to the one or more of the first set of robots. Failure to perform one or more tasks may either be due to presence of limited number of robots and drones in the first set of robots or due to malfunctioning of one or more of such robots.

Further, if the one or more of the second set of robots failed to provide the requested support to the one or more of the first set of robots, again a request message may be sent to one or more of a third set of robots (for example, red color tag robots and red color tag drones). It may be noted that the first set of robots cannot directly communicate with the third set of robots. Such communication needs to be routed through one or more of the second set of robots that can directly communicate with the third set of robots. However, the third set of robots may directly communicate with each of the first set of robot and the second set of robots whenever needed.

By way of an example, the cyan color tag robots and the green color tag drones are allocated to perform a plurality of tasks. In case of situations where the cyan color tag robots require an additional support due to insufficient capability or due to injury, damage or repair, they are only permitted to request help from the magenta color tag robots and the blue color tag drones within the same group. Similarly, the green color tag drones may request a service only from the blue color tag drones of the same group. If magenta color tag robots and the blue color tag drones are not able to provide support to the cyan color tag robots and the green color tag drones, then the magenta color tag robots and the blue color tag drones may request the red color tag robots or the red color tag drones to service the request.

The cyan color tag robots and the color green tag drones cannot directly request the red color tag robots for support, as they do not have privileges to do so. Therefore, they have to go through the magenta color tag robots and the blue color tag drones for support. The red color tag robots are superior to all other color tag robots and drones of the same group and may service any task on their own or based on request received from the cyan and magenta color tag robots, and green and blue color tag drones. However, it may be noted that the cyan, magenta and red color tag robots and the red, green, and blue color tag drones may request for emergency service of the yellow color tag robots as these are special purpose robots with special capabilities. In an embodiment, the yellow color tag robots may provide services to all color tag robots or drones only in response to a request.

If each of the third set of robots (for example, the red color tag robots and the red color tag drones) of a first group fails to provide the service requested by the first set and the second set of robots of the same group, then the third set of robots of that group may request a third set of robots of a second group to provide the service. It may be noted that the third set of robots of the first group may not request service from the first and second set of robots of the second group. By way of an example, if the red color tag robots within a group are not able to service the request of other color tag robots or drones of the same group due to whatever reasons, they may request the service from red color tag robots of other groups. The red color tag robots within a group cannot request service from the cyan and magenta color tag robots or green and blue color tag drones in other groups. The red color tag robots of the other groups may service the request only on request from the red color tag robots of other groups or based on a request from a prime robot.

The process of electing a plurality of chief robots and the selection of the prime robot from the elected chief robots is depicted by way of FIG. 4B. On the basis of historic performance and capabilities of a third set of robots of a group, a first voting may be performed to elect a chief robot for that group. Further, on the basis of a second voting amongst the plurality of chief robots of each of the plurality of groups, the prime robot may be selected. For example, firstly all the cyan and magenta color tag robots and the green and blue color tag drones of a group may vote and select one of the red color tag robots in the group as a chief robot. Thus, for the plurality of groups, we may have a plurality of chief robots. Each of the plurality of chief robots may now vote and select the prime robot across the plurality of groups. Since the selection of the prime robot may be based on election and since at each level the selection of a robot is random, therefore it may be difficult for any robot or an intruder to zero in on a robot that would be selected as a prime robot in future. As a result, not such intruder robot will be able to take control of communication between robots and drones.

Now, the communication between the plurality of chief robots and the prime robot is depicted in FIG. 4C. The solid lines indicate the request messages sent from a chief robot of a group to a chief robot of any other group, and the prime robot. The dotted lines indicate response messages for the corresponding request messages. The prime robot may have high privileges as compared to all the robots and drones. The prime robot may be able to monitor activities of each of the plurality of groups, and robots and drones within each of the plurality of groups along with each yellow robot. The plurality of chief robots may have multiple responsibilities, such as, collaboration of tasks amongst drones and robots, co-ordination of tasks amongst the drones and robots, and mitigation of failures or unexpected results, and security of operation. The above mentioned responsibilities may be handled automatically by the plurality of chief robots due to the defined communication protocol and the security mechanism used between the robots and drones.

Figure 5:
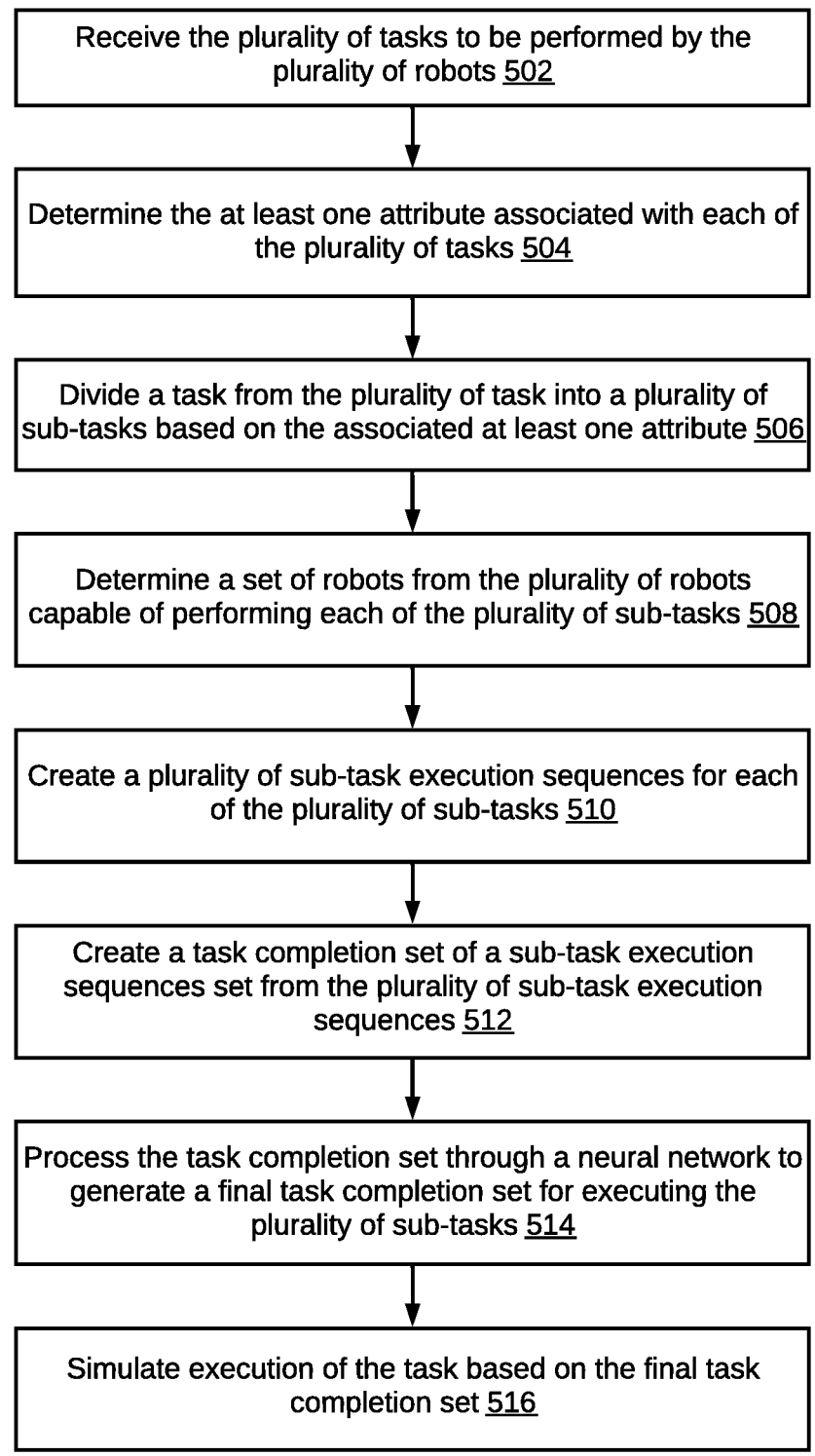
FIG. 5 illustrates a flowchart of a method for execution of tasks to be performed by a plurality of robots, in accordance with an embodiment.

Referring now to FIG. 5, a flowchart of a method for execution of tasks to be performed by a plurality of robots is illustrated, in accordance with an embodiment. At step 502, the plurality of tasks to be performed by the plurality of robots may be received. After assigning the color tags to the plurality of robots, electing the plurality of chief robot, and selecting a prime robot, the plurality of robots may receive the plurality of tasks. At step 504, one or more attributes associated with each of the plurality of tasks may be determined. The one or more attributes may include, but are not limited to task details, such as, purpose of task, time to execute a specific task, priority of tasks, and order of task which have already been explained in detail in conjunction with FIG. 3.

At step 506, a task from the plurality of tasks may be divided into a plurality of sub-tasks based on the associated one or more attributes. In one embodiment, for example, the plurality of sub-tasks may be identified based on tables in the database 232, which provide the list of sub-tasks for a given task. This is further explained in detail in conjunction with FIG. 6. The provided sub-tasks may be iteratively searched in the database 232 in order to identify whether further sub-tasks for the present sub-tasks exist, till a null value is returned. At step 508, a set of robots that is capable of performing each of the plurality of sub-tasks may be determined from the plurality of robots. In other words, for example, an identified sub-task may be mapped to drones, robots or a combination of drones and robots that may perform the identified sub-task.

At step 510, a plurality of sub-task execution sequences may be created for each of the plurality of sub-tasks. A sub-task execution sequence associated with a sub-task may include details of one or more robots and one or more drones that are capable of performing the sub-task. This is further explained in detail in conjunction with FIG. 6. At step 512, a task completion set may be created for the task. The task completion set may further include a set of sub-task execution sequences selected from the plurality of sub-task execution sequences created for each of the plurality of sub-tasks. The task completion set may further include the robots with a first color tag. In other words, for example, for each sub-task there may be multiple drones or robots which can perform the sub-task. The entire list of drones and robots details, and sub-tasks details may get passed to the task segregation module 222, which may employ a neural network (for example, an LSTM model). The neural network may generate groups with a list of drones and robots which may perform the group tasks.

At step 514, the task completion set may further get processed through the neural network to generate a final task completion set. The final task completion set may include a rearranged sequence for executing the plurality of sub-tasks. Each sub-task in the final task completion set is allocated a robot from the plurality of robots. This robots is assigned one of the first color tag, the second color tag, or the third color tag. In other words, the neural network takes the task completion set for each sub-task belonging to all the main tasks given as input. The neural network may take the group names and their unique IDs. By way of an example, the neural network (for example, a bidirectional LSTM) may be trained to generate a group that includes the right set of CMR robots and RGB drones based on the type, purpose, priority and execution time of sub-tasks. In an embodiment, the neural network may take a task completion set with C robots, G drones from previous step and the list of MR robots and RB drones as input and generates the group with the CMR robots and the RGB drones.

By way of an example, a task T1 include the following sub-tasks: S1, S2, S3, and S4. For the task T1, a task completion set, i.e., {S1→D1, D3, S2→D3, D6, S3→D5, D9, S4→R4, R5} is given as input to the trained neural network. The output of the trained neural network may be a final task execution sequence, i.e., {S1→D1, S3→D5, D9, S2→D3, D6, S4→R4, R5}. The final task execution sequence is the rearranged ordered task execution sequence. It provides the list of sub-tasks in the order of execution to complete the task T1. The rearranged order of execution may also be the optimal order of execution for which the neural network is trained.

In an exemplary scenario, when the neural network is LSTM, it may be based on two-layer model architecture. The first layer may take the task completion set as input and may give output as the group policy defined for the drones and robots. The second layer may take the defined group policy in its input side and may give a final output with the optimal task execution sequence. For the given task completion set, the bidirectional LSTM may learn about the optimal order of the execution using the given sub-task execution sequence. As the second layer is concatenated with the output of the first layer and the group policy defined for drones and robots, the LSTM may learn the order of task execution constrained by the group policy rules. This generated sequence may be special, since it has been dynamically generated for the given task considering the drone and robots characteristics, group policies defined for the drones and robots to work as a group, and exceptional characteristics of the drones and robots, if any. The final task execution sequence is considered to be the optimal ordered sequence of execution for the given task with reduced cost.

At step 516, the execution of the task may be simulated based on the final task completion set and in conformance with roles and color tags assigned to each of the plurality of robots. In other words, this simulation may be done to verify if the existing dynamics and infrastructure of the current environment supports the task execution sequence, since the existing neural network would have been trained earlier with certain assumptions. If the simulation fails, a new sequence from the neural network may be tried and the process is repeated till a successful sequence is found. If none is found, then the input is given to the prime robot which may be used to train the neural network with new details collected over a period of time. Since multiple task execution sequence exists to complete the given task, the simulation is tried using each of these sequences till the successful sequence is identified. For each unsuccessful task execution sequence, the prime robot analyses the reason of failure and tries to correct it using new drones or robots added to the system or using the updates of the group policies. Even if the prime robot is unable to find a successful task execution sequence, it stores the learning (reasons of failure) in the database 232. For the failed task execution sequences, the prime drone checks the percentage of failure. If the percentage of failure is within a system defined threshold, then the prime robot uses the task execution sequence with minimum failure percentage and within the system defined threshold. In another embodiment, the prime robot may go ahead to use the task execution sequence with minimum failure percentage.

After the simulation of executed task, the successful simulated sequence may be used for a real time execution in an actual environment. The sequence may be handed over to one or more red color tag robots in the group for execution. One of the red color tag robots may be selected as the prime robot securely using voting mechanism. The prime robot arranges the execution from starting till the completion of the task. The ordered sequence of task execution given by the neural network to the prime robot may be the optimal sequence. But during the execution, based on dynamics of environment and infrastructure changes, non-working condition of drones or robots, failures of drones or robots during operation and many such scenarios may lead to change in the execution order. Moreover, sometimes the addition or removal of drones from the group may disturb the sequence of the task. When such kind of scenarios and similar such scenarios happen, the prime robot is intelligent enough to optimize the new sequence of operations. It maintains the list of optimal operations and learning during execution in the repository and uses them while finding new optimal solutions as and when required.

The results of task completion, for example, percentage of completion, failure and its reason(s), learning during execution, are all captured and stored in the database 232. The learning throughout the execution of a task from starting to the end of the completion of the task may get recorded by the prime robot and may be stored in the database 232. All the details of learning may be used at regular intervals to update the neural network so that the same problem may not be repeated again. The results are also provided in a structured manner as output from the system. The captured result that are stored in the database 232 during the task execution may include details, such as, the final ordered task sequence used for task completion, the addition, removal and replacement of drones or robots performed during task execution, failure and exceptions occurred and their handling mechanism, the co-ordinations steps, if any, used by the prime robot, and the collaboration steps, if any, used by the prime robot.

In an exemplary embodiment, referring now to FIG. 6, which illustrates a table 600 depicting suitable allocation of one or more of drones and robots for performance of a plurality of sub-tasks associated with a task. The tables 600 may be stored in the database 232. The table 600 may include a plurality of sub-tasks that may be performed by robots, drones, a combination of robots and drones. Few sub-tasks in the table 600 do not have an entry in one or more of a robot column, a drone column, and a combination column. The drones or robots or any combination thereof is selected to perform a task on the basis of the type of task and the functions that the drones or robots may perform.

As discussed earlier, each drone or robot may either perform a single function or multiple functions. Some of the drones or robots may perform only one type of function. Such types of robots or drones are called uni-functional drones or uni-functional robots. The drones or robots which may perform multiple functions or operations are called multi-functional drones or robots. The operations that may be performed by either drones alone or by robots alone and not by any combination of both are called homogenous operations and the operations performed by the combination of drones and robots are called heterogeneous operations.

In an embodiment, when more than one drone, robot, or combination of both of them are performing a task, it is always referred to as a group of drones or robots. In contrast when only one drone or robot is involved, it is referred as single drone or robot. By way of an example, for a task T1, the sub-task list may be obtained from the table 600 stored in the database 232. From the table 600, it may be observed the task T1 include the following sub-tasks: S1, S2, S3, and S4. Further, it may be observed that S1 and S2 are heterogeneous tasks, while S3 and S4 are homogeneous tasks. D1, D3, D8, D11, and R3, R6 respectively are multi-functional drones and multi-functional robots, while D5, D9, and R4, R5 respectively are uni-functional drones and uni-functional robots.

Based on the table 600, the sub-task S1 may be completed using one of (D1, D3), (D8, D11), (R3, R6), (R9, R10), (D9, R10), (D1, R3). In a similar manner, one or more robots, drones, or combination thereof, that may be used to perform the sub-task S2, S3, and S4 are depicted in the table 600. Each of these sequences {S1→D1, D3}, {S→R3, R6} are called sub-task execution sequence. In this exemplary embodiment, a task completion set: {S1→D1, D3, S2→D3, D6, S3→D5, D9, S4→R4, R5} may be used for completion of the task T1. However, the order of execution is not known. From the table 600, it may be noted that there exists multiple sub-task execution sequences and multiple task completion sets. The identified task completion set, for example, may include cyan color tag robots and green color tag drones, since they are service robots and drones.

Figure 7:
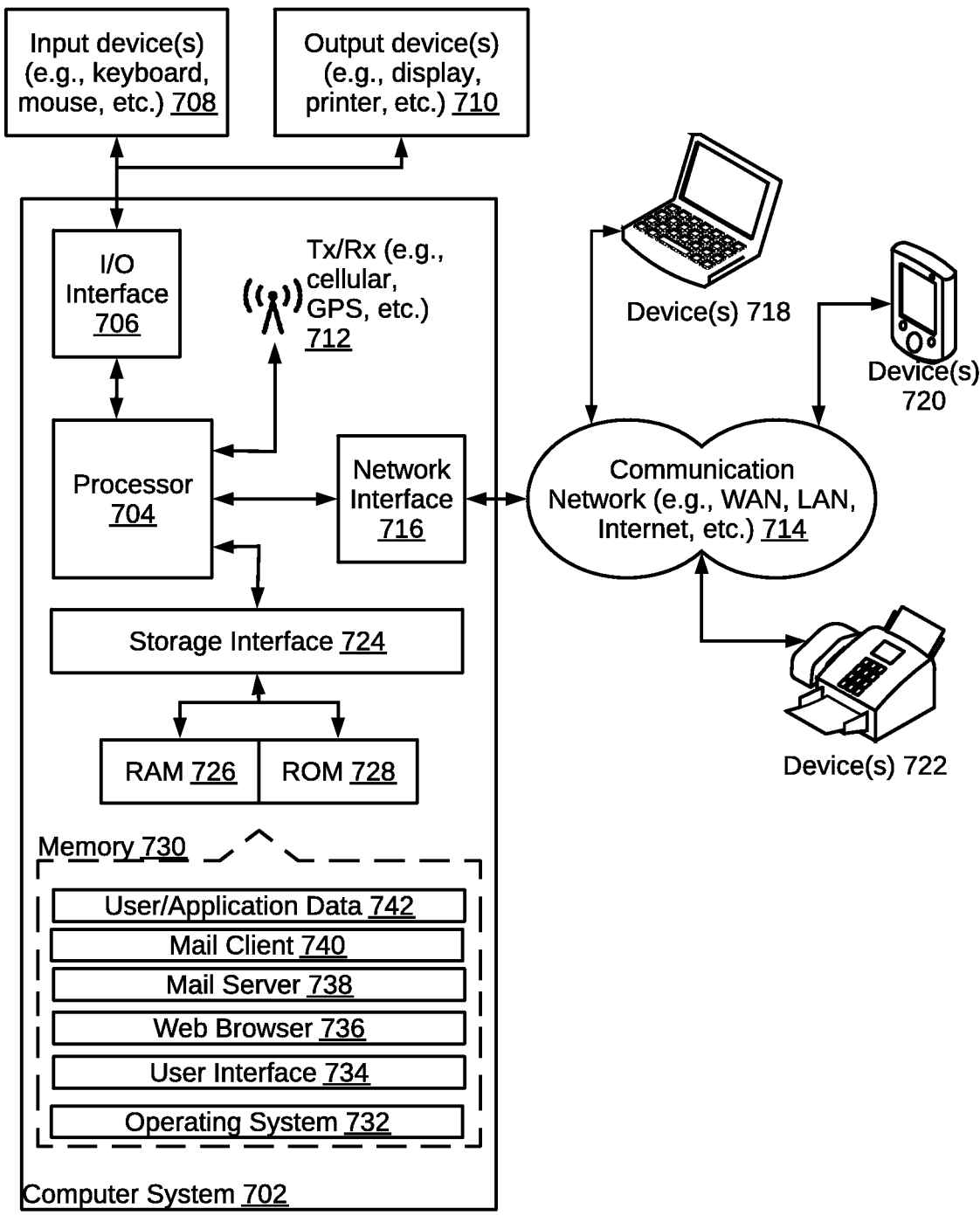
FIG. 7 illustrates a block diagram of an exemplary computer system for implementing various embodiments.

FIG. 7 is a block diagram of an exemplary computer system 702 for implementing various embodiments. Computer system 702 may include a central processing unit ("CPU" or "processor") 704. Processor 704 may include at least one data processor for executing program components for executing user- or system-generated requests. A user may include a person, a person using a device such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution 2(LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices 718, 720, and 722 may include, without limitation, personal computer(s), server(s), fax machines, printers, scanners, various mobile devices such as cellular telephones, smartphones (e.g., APPLE® (PHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices 718, 720, and 722.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces 734 may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOGGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 736 may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention disclose method, device and system for managing collaboration amongst robots. The entire system of robots and drones are built based on protocol (rules) which is inherent in the system. The protocol may be built not only for managing collaboration of drones and robots but also to avoid a conflict resolution among the drones and robots during the task execution, a deadlocks during task execution, an intruder or malicious attack on the system or individual robot or drones. The system also provides a secure communication among robots and drones, secure hierarchical structure for collaboration of tasks and communication between robots and drones, a distributed control mechanism allowing better fault tolerant system during failures or damages, a hierarchical control flow among individual robots and drones based on their type, chief robots and prime robots and specialized robots and a defined structure to handle control flow during sharing and transfer or tasks to other robots and drones. The above disclosed method, device, and system may be used to perform a new task requested by the user adaptively. The simulation supported just before the execution of the task may ensures that the task can be performed seamlessly and does not get stalled in the middle. Moreover, to provide support for multiple tasks at a time, the system optimally uses the drones and the Robots each performing the task of multiple users at a time.

The specification has described method, device, and system for managing collaboration amongst robots. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing collaboration amongst robots, the method comprising:
    assigning a color tag from a set of predefined color tags to each of a plurality of robots, based on associated functional capabilities, wherein assigning the color tag to each of the plurality of robots defines a hierarchical relation amongst the plurality of robots, and wherein,
    a first color tag is assigned to each of the plurality of robots having functional capabilities less than or equal to a first threshold,
    a second color tag is assigned to each of the plurality of robots having functional capabilities greater than a first threshold and less than or equal to a second threshold, wherein a robot assigned the first color tag is permitted to directly communicate with a robot assigned the second color tag, and
    a third color tag is assigned to each of the plurality of robots having functional capabilities greater than the second threshold, wherein a robot assigned the second color tag is permitted to directly communicate with a robot assigned the third color tag;
    dynamically creating a plurality of groups for a plurality of tasks based on at least one attribute associated with each of the plurality of tasks and functional capabilities associated with the plurality of robots, wherein each of the plurality of groups comprises a first set of robots assigned the first color tag, a second set of robots assigned the second color tag, and a third set of robots assigned the third color tag;
    electing a plurality of chief robots for the plurality of groups, by robots in the associated first set of robots and second set of robots based on a first predefined logic, wherein a chief robot of a group within the plurality of groups is elected from a third set of robots associated with the group; and
    selecting a prime robot from the plurality of chief robots based on a second predefined logic, wherein the prime robot is configured to monitor activity of each of the plurality of groups and each robot in each of the plurality of groups.

2. The method of claim 1, wherein the plurality of robots comprise a plurality of drones, and wherein each of the plurality of robots are configured to communicate amongst each other over a secure channel using key encryption.

3. The method of claim 1, wherein a fourth color tag is assigned to a robot from the plurality of robots that is configured to provide a plurality of emergency services to at least one of the plurality of robots, and wherein each of the remaining plurality of robots is permitted to directly communicate with the robot assigned the fourth color tag.

4. The method of claim 3, wherein the plurality of emergency services comprises at least one of battery recharge, fuel recharge, fire extinguishing, and repairing faulty robots.

5. The method of claim 1, further comprising:
    receiving the plurality of tasks to be performed by the plurality of robots; and
    determining the at least one attribute associated with each of the plurality of tasks.

6. The method of claim 5, further comprising:
    dividing a task from the plurality of task into a plurality of sub-tasks based on the associated at least one attribute;
    determining a set of robots from the plurality of robots capable of performing each of the plurality of sub-tasks;
    creating a plurality of sub-task execution sequences for each of the plurality of sub-tasks, wherein a sub-task execution sequence associated with a sub-task comprises details of at least one robot capable of performing the sub-task; and
    creating a task completion set for the task, wherein the task completion set comprises a set of sub-task execution sequences selected from the plurality of sub-task execution sequences created for each of the plurality of sub-tasks, wherein the task completion set comprises robots assigned the first color tag.

7. The method of claim 6, further comprising processing the task completion set through a neural network to generate a final task completion set, wherein the final task completion set comprises a rearranged sequence for executing the plurality of sub-tasks, and each sub-task in the final task completion set is allocated a robot from the plurality of robots that is assigned one of the first color tag, the second color tag, or the third color tag.

8. The method of claim 7, further comprising simulating execution of the task based on the final task completion set and in conformance with roles and color tags assigned to each of the plurality of robots.

9. A robot collaboration device for managing collaboration amongst robots, the robot collaboration device comprising:
    a processor; and a memory communicatively coupled to the processor, wherein the memory stores processor instructions, which, on execution, causes the processor to:
assign a color tag from a set of predefined color tags to each of a plurality of robots, based on associated functional capabilities; wherein assigning the color tag to each of the plurality of robots defines a hierarchical relation amongst the plurality of robots, and wherein,
a first color tag is assigned to each of the plurality of robots having functional capabilities less than or equal to a first threshold,
a second color tag is assigned to each of the plurality of robots having functional capabilities greater than a first threshold and less than or equal to a second threshold, wherein a robot assigned the first color tag is permitted to directly communicate with a robot assigned the second color tag, and
a third color tag is assigned to each of the plurality of robots having functional capabilities greater than the second threshold, wherein a robot assigned the second color tag is permitted to directly communicate with a robot assigned the third color tag;
dynamically create a plurality of groups for a plurality of tasks based on at least one attribute associated with each of the plurality of tasks and functional capabilities associated with the plurality of robots, wherein each of the plurality of groups comprises a first set of robots assigned the first color tag, a second set of robots assigned the second color tag, and a third set of robots assigned the third color tag;
elect a plurality of chief robots for the plurality of groups, by robots in the associated first set of robots and second set of robots based on a first predefined logic, wherein a chief robot of a group within the plurality of groups is elected from a third set of robots associated with the group; and
select a prime robot from the plurality of chief robots based on a second predefined logic, wherein the prime robot is configured to monitor activity of each of the plurality of groups and each robot in each of the plurality of groups.

10. The robot collaboration device of claim 9, wherein the plurality of robots comprise a plurality of drones, and wherein each of the plurality of robots are configured to communicate amongst each other over a secure channel using key encryption.

11. The robot collaboration device of claim 9, wherein a fourth color tag is assigned to a robot from the plurality of robots that is configured to provide a plurality of emergency services to at least one of the plurality of robots, and wherein each of the remaining plurality of robots is permitted to directly communicate with the robot assigned the fourth color tag.

12. The robot collaboration device of claim 11, wherein the plurality of emergency services comprises at least one of battery recharge, fuel recharge, fire extinguishing, and repairing faulty robots.

13. The robot collaboration device of claim 9, wherein the processor instructions further cause the processor to:
receive the plurality of tasks to be performed by the plurality of robots; and
determine the at least one attribute associated with each of the plurality of tasks.

14. The robot collaboration device of claim 13, wherein the processor instructions further cause the processor to:

divide a task from the plurality of task into a plurality of sub-tasks based on the associated at least one attribute;
determine a set of robots from the plurality of robots capable of performing each of the plurality of sub-tasks;
create a plurality of sub-task execution sequences for each of the plurality of sub-tasks, wherein a sub-task execution sequence associated with a sub-task comprises details of at least one robot capable of performing the sub-task; and
create a task completion set for the task, wherein the task completion set comprises a set of sub-task execution sequences selected from the plurality of sub-task execution sequences created for each of the plurality of sub-tasks, wherein the task completion set comprises robots assigned the first color tag.

15. The robot collaboration device of claim 14, wherein the processor instructions further cause the processor to:
process the task completion set through a neural network to generate a final task completion set, wherein the final task completion set comprises a rearranged sequence for executing the plurality of sub-tasks, and each sub-task in the final task completion set is allocated a robot from the plurality of robots that is assigned one of the first color tag, the second color tag, or the third color tag.

16. The robot collaboration device of claim 15, wherein the processor instructions further cause the processor to simulate execution of the task based on the final task completion set and in conformance with roles and color tags assigned to each of the plurality of robots.

17. A system for managing collaboration amongst robots, the system comprising:
a plurality of robots;
a central controller communicatively coupled to each of the plurality of robots, wherein the central controller is configured to:
assign a color tag from a set of predefined color tags to each of the plurality of robots, based on associated functional capabilities, wherein assigning the color tag to each of the plurality of robots defines a hierarchical relation amongst the plurality of robots, and wherein,
a first color tag is assigned to each of the plurality of robots having functional capabilities less than or equal to a first threshold,
a second color tag is assigned to each of the plurality of robots having functional capabilities greater than a first threshold and less than or equal to a second threshold, wherein a robot assigned the first color tag is permitted to directly communicate with a robot assigned the second color tag, and
a third color tag is assigned to each of the plurality of robots having functional capabilities greater than the second threshold, wherein a robot assigned the second color tag is permitted to directly communicate with a robot assigned the third color tag;
dynamically create a plurality of groups for a plurality of tasks based on at least one attribute associated with each of the plurality of tasks and functional capabilities associated with the plurality of robots, wherein each of the plurality of groups comprises a first set of robots assigned the first color tag, a second set of robots assigned the second color tag, and a third set of robots assigned the third color tag;

elect a plurality of chief robots for the plurality of groups, by robots in the associated first set of robots and second set of robots based on a first predefined logic, wherein a chief robot of a group within the plurality of groups is elected from a third set of robots associated with the group; and select a prime robot from the plurality of chief robots based on a second predefined logic, wherein the prime robot is configured to monitor activity of each of the plurality of groups and each robot in each of the plurality of groups.

18. The system of claim 17, wherein the plurality of robots comprise a plurality of drones, and wherein each of the plurality of robots are configured to communicate amongst each other over a secure channel using key encryption.

19. The system of claim 17, wherein a fourth color tag is assigned to a robot from the plurality of robots that is configured to provide a plurality of emergency services to at least one of the plurality of robots, and wherein each of the remaining plurality of robots is permitted to directly communicate with the robot assigned the fourth color tag.

20. The system of claim 19, wherein the plurality of emergency services comprises at least one of battery recharge, fuel recharge, fire extinguishing, and repairing faulty robots.

* * * * *